United States Patent
Burykh et al.

(10) Patent No.: US 10,644,734 B2
(45) Date of Patent: May 5, 2020

(54) LOW-IF RECEIVER

(71) Applicant: Sequans Communications S.A., Colombes (FR)

(72) Inventors: Serguei Burykh, Colombes (FR); Thomas Winiecki, Reading (GB); Serdar Sezginer, Colombes (FR); Krzysztof Walczak, Colombes (FR)

(73) Assignee: SEQUANS COMMUNICATIONS S.A., Colombes (FR)

( * ) Notice: Subject to any disclaimer, the term of this patent is extended or adjusted under 35 U.S.C. 154(b) by 0 days.

(21) Appl. No.: 15/937,759

(22) Filed: Mar. 27, 2018

(65) Prior Publication Data
US 2018/0287644 A1 Oct. 4, 2018

(30) Foreign Application Priority Data
Mar. 31, 2017 (EP) .................................... 17305394

(51) Int. Cl.
| | |
|---|---|
| *H04B 1/10* | (2006.01) |
| *H04B 1/00* | (2006.01) |
| *H04L 27/06* | (2006.01) |
| *H04B 1/16* | (2006.01) |
| *H04B 1/26* | (2006.01) |
| *H04W 72/04* | (2009.01) |

(52) U.S. Cl.
CPC ................ *H04B 1/10* (2013.01); *H04B 1/16* (2013.01); *H04B 1/26* (2013.01); *H04W 72/0453* (2013.01); *H04B 2001/1045* (2013.01)

(58) Field of Classification Search
CPC ... H04B 1/10; H04B 1/16; H04B 1/26; H04B 2001/1045; H04B 1/12; H04B 1/00; H04W 72/0453; H04L 27/06; H03D 1/04
See application file for complete search history.

(56) References Cited

U.S. PATENT DOCUMENTS

| | | | | |
|---|---|---|---|---|
| 6,957,056 | B2* | 10/2005 | Fitzrandolph | H03J 1/0008 455/131 |
| 8,848,833 | B2* | 9/2014 | Kravets | H04B 1/0007 375/316 |
| 9,413,402 | B1 | 8/2016 | Mayer et al. | |
| 2006/0079195 | A1 | 4/2006 | Beamish et al. | |
| 2006/0281427 | A1* | 12/2006 | Isaac | H03D 3/008 455/209 |
| 2010/0048157 | A1* | 2/2010 | Carrera | G01S 19/32 455/307 |
| 2017/0201278 | A1* | 7/2017 | Dehmas | H04B 1/1036 |

OTHER PUBLICATIONS

Extended European Search Report for European Application No. 17305394.3, titled: Low-IF Receiver, dated Sep. 25, 2017.

\* cited by examiner

*Primary Examiner* — Pablo N Tran
(74) *Attorney, Agent, or Firm* — Hamilton, Brook, Smith & Reynolds, P.C.

(57) ABSTRACT

A method of selecting an intermediate frequency, IF, for use with a low-IF receiver, the method comprising determining a first frequency as the central frequency of the system bandwidth of the communication scheme used by the low-IF receiver, determining a second frequency as the central frequency of the bandwidth of the wanted signal to be received, selecting the sign of the IF to be used based on the first and second frequencies.

14 Claims, 6 Drawing Sheets
(5 of 6 Drawing Sheet(s) Filed in Color)

Fig. 11

LOW-IF RECEIVER

RELATED APPLICATION

This application claims priority under 35 U.S.C. § 119 or 365 to European Application No. EP 17305394.3, filed on Mar. 31, 2017. The entire teachings of the above application are incorporated herein by reference.

TECHNICAL FIELD

This invention relates to a low-IF (intermediate frequency) receiver. It is particularly suitable for, but by no means limited to LTE enhanced machine type communications (eMTC).

BACKGROUND eMTC (or LTE Cat-M1), is a particular version of LTE (4G) wireless communications standard supported by 3GPP (and by major operators and equipment vendors within 3GPP). It aims to provide low-cost yet reliable connectivity for internet-of-things (IoT) and device-to-device communication applications. Its main characteristics include significantly increased battery life, coverage extension (i.e., connectivity even in very bad signal conditions), and low cost.

For eMTC devices operating in system bandwidths higher than 10 resource blocks (RBs), known architectures use either wideband (WB) zero-IF (direct conversion) receivers or narrowband (NB) zero-IF receivers.

In the WB approach, the radio local oscillator (LO) is tuned to the centre of the system bandwidth and all resource blocks of the system bandwidth are preserved and converted into the digital domain.

In the NB approach, which is cost-efficient and power-efficient compared to WB architectures, the receiver exploits the fact that transmission is done in 'narrowbands' (NB) within a given system bandwidth. eMTC uses narrowbands of 72 subcarriers (6 resource blocks) with subcarrier spacing 15 kHz. The local oscillator is tuned to the centre of the 6 RB sub-band. For example, a system bandwidth of 10 MHz (50 resource blocks) will contain 8 non-overlapping narrowbands of 1.08 MHz of 6 resource blocks each. A system bandwidth of 20 MHz (100 resource blocks) is divided into 16 non-overlapping narrowbands of 6 resource blocks each. It is noted that as 50 or 100 does not divide by 6, a subset of resource blocks remain unused, according to standard.

However, the consequence of using NB RF with direct conversion (zero-IF) is that the DC carrier needs to be punctured, i.e., all data transmitted on this carrier is considered as irrevocably lost due to being completely overshadowed by DC, and this results in significant performance degradation.

Typically, an eMTC device comprises Rx (receiver) and Tx (transmitter) chains, which have analog (RF), mixed-signal processing (such as ADC, DAC) as well as digital circuitry known as baseband signal processing, and software running on a dedicated digital signal processor, DSP.

SUMMARY

Accordingly there is a need for a different approach that allows the use of both standard eMTC hardware and the aimed for low-cost yet reliable connectivity for internet-of-things (IoT) and device-to-device communication applications by way of increased battery life, coverage extension and low cost.

According to a first aspect there is provided a method as defined in claim 1 of the appended claims. Thus there is provided a method of selecting an intermediate frequency, IF, for use with a low-IF receiver, the method comprising determining a first frequency as the central frequency of the system bandwidth of the communication scheme used by the low-IF receiver, determining a second frequency as the central frequency of the bandwidth of the wanted signal to be received by the low-IF receiver, selecting the sign of the IF to be used based on the first and second frequencies.

Optionally, the sign of the IF to be used is selected so that power of an interferer adjacent to the system bandwidth is minimised in the receive chain of the low-IF receiver.

Optionally, the method wherein the sign of the IF to be used is selected so that an analog RF baseband filter of the low-IF receiver blocks at least a portion of the adjacent interferer.

Optionally, the method wherein the sign of the IF to be used is selected as negative if the second frequency is less than the first frequency in the system bandwidth.

Optionally, the method wherein the sign of the IF to be used is selected as positive if the second frequency is more than the first frequency in the system bandwidth.

Optionally, the method wherein the sign of the intermediate frequency is equal to sign(second frequency−first frequency).

Optionally, the method wherein the modulus of the IF to be used is selected so as to minimise DC carrier puncturing of the wanted signal to be received.

Optionally, the method wherein the modulus of the IF to be used is selected based on the position of DC of the receiver relative to the wanted signal.

Optionally, the method wherein the modulus of the IF to be used is selected so that the position of DC falls outside of the wanted signal and it is filtered by a digital front-end filter of the low-IF receiver thereby avoiding any DC carrier puncturing.

Optionally, the method wherein the modulus of the IF to be used is selected so that the position of DC falls outside of the wanted signal and onto a guard band of an FFT module of the low-IF receiver and is thrown away when obtaining the result of the FFT thereby avoiding any DC carrier puncturing.

Optionally, the method wherein the modulus of the IF to be used is selected so that the position of the DC falls within the wanted signal but in between two carriers of the wanted signal thereby reducing DC carrier puncturing.

Optionally, the method wherein to down convert an incoming RF signal to the intermediate frequency to be used, a local oscillator of the low-IF receiver is set to provide a frequency output of the second frequency minus the intermediate frequency to be used to an input of a mixer, the mixer having a further input of the incoming RF signal and an output at the intermediate frequency to be used.

According to a second aspect there is provided a computer readable medium as defined in claim 13.

According to a third aspect there is provided a low-IF receiver configured to carry out the method.

With all the aspects, preferable and optional features are defined in the dependent claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments will now be described, by way of example only, and with reference to the drawings in which.

In the figures, like elements are indicated by like reference numerals throughout.

OVERVIEW

Low-IF receivers have been widely used for GSM (narrowband) transmission, yet for wideband (WCDMA, LTE), the majority of known architectures utilise zero-IF receivers.

A low-IF receiver architecture means that a received RF signal is not directly demodulated to baseband (i.e., zero intermediate frequency, as in 'zero-IF' receivers), but is first demodulated to an intermediate frequency (IF). Therefore, signal demodulation to baseband in low-IF receivers is done in two stages: firstly, from RF frequency (e.g., several GHz) to intermediate frequency (typically, few hundreds of kHz) and secondly, from intermediate frequency to baseband. A suitable intermediate frequency is larger than half the bandwidth of the desired signal. For example, for 6 resource blocks associated with LTE Cat-M, the signal bandwidth is 1.08 MHz. Therefore, the intermediate frequency should be at least 540 kHz. In addition, it is beneficial to move the intermediate frequency out further away from DC to minimize flicker noise and IM2 images from narrow unwanted signals (discussed later). The flicker noise corner in typical designs is around 100 kHz-300 kHz and narrow blockers include GSM signal of 200 kHz. However, moving the intermediate frequency too far increases the bandwidth that the receiver must process. In general, the optimum intermediate frequency is therefore half the desired signal bandwidth plus a few 100 kHz.

This disclosure describes how to select a low-IF for use in a low-IF receiver. A dedicated hardware solution (for example, design of typical eMTC filters or selection filter bandwidth) as with many known approaches is outside the scope of this disclosure.

Selection of a low-IF for the receiver is achieved by either or both of the following:

1) The sign of the IF is selected to aid rejection of adjacent interferers 34. The sign is based on the centre frequency, $f_{NB}$ (32) of the wanted NB signal 30 it is desired to receive and the centre frequency, $f_{0,systemBW}$ (39) of overall system bandwidth 33.

According to 3GPP TS 36.101, adjacent channel power can be as high as 45.5 dB above the wanted channel power. The unwanted adjacent interferer is a major design challenge for eMTC devices, especially when demodulating NBs close to the edge of the system bandwidth. A strong adjacent interferer, when not filtered enough, is capable of saturating the analog and digital circuitry of the receiver, and also reduces available ADC dynamic range as would be understood (see FIGS. 2 and 3 described later).

Conventional (direct-conversion) receiver architectures rely on analog RF and digital front-end filtering for adjacent channel reduction. These filters, especially analog ones, are costly.

2) The modulus of the IF is selected in order to minimise the impact (overshadowing) of DC offset 40. The modulus is based on one of the digital front-end filter (21) response of the receiver, the FFT module (22) output bandwidth of the receiver, and sub-carrier position within the wanted NB signal 30 it is desired to receive.

In conventional (direct-conversion) receiver architectures, the DC offset falls right in the middle of the demodulated (baseband) bandwidth (see FIG. 4 described later). In the particular case of eMTC transmission, the central carrier of demodulated wanted NB becomes useless (considered lost).

This solution, therefore, provides all of the benefits of a simple eMTC communications device with negligible additional cost by way of avoiding any design specific (and hence costly) hardware changes.

It should be noted that the scope of this disclosure equally applies to receivers using the LTE Cat-M2 (NB-IOT) standard. Compared to LTE Cat-M1 (eMTC), NB-IOT transmission, is done in bands of 1 resource block (12 contiguous subcarriers). Hence, an NB-IOT receiver, using an NB approach, will demodulate one RB (12 contiguous subcarriers), while LTE Cat-M1 receiver will demodulate 6 RBs (72 contiguous subcarriers) as discussed in the background section. Other than the transmission differences, the IF frequency selection method and receiver architecture described herein equally applies to NB-IOT. In the detailed description, only eMTC (LTE Cat-M2) is discussed for simplicity.

DETAILED DESCRIPTION

Figure 1:
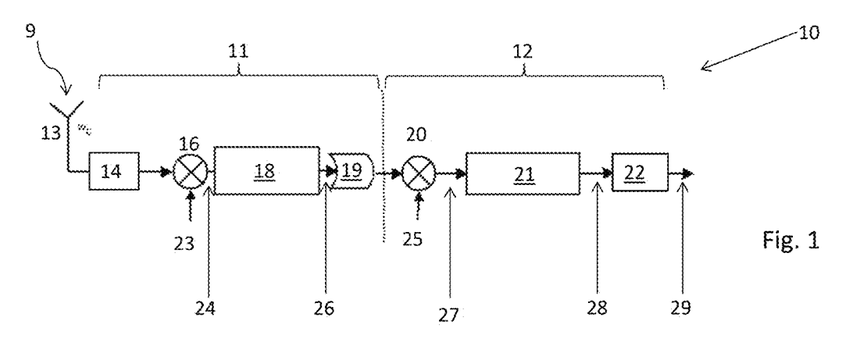
FIG. 1 illustrates Low-IF eMTC receiver front-end according to an embodiment.

Turning to FIG. 1, a low-IF eMTC receiver front-end 10 is shown having an analog domain 11 and a digital domain 12 as would be understood. In the analog domain 11, the receiver 10 comprises an antenna 13 (for receiving RF signal 9) coupled to a low noise amplifier (LNA) 14 which feeds into a first input of a mixer 16. The mixer 16 has a second input for feeding with a signal 23 from a local oscillator comprising a complex sine wave at frequency $-f_{LO}$ to form a down converted signal 24 at an intermediate frequency, $f_{IF}$. The output of the mixer is coupled to an analog RF baseband filter 18. Typical analog RF baseband filter 18 response is a low pass filter centered around DC comprising a passband of $w \times NB_{BW}$, where $NB_{BW}$ is wanted NB bandwidth (1.08 MHz, 6 LTE RBs). w>1 is a design-dependent parameter which is typically related to sampling rate of baseband ADC as would be understood. Filter 18 forms signal 26 which in turn feeds into an ADC 19 for converting the signal into the digital domain 12. Coupled to the output of the ADC 19 is a first input of a digital de-rotator 20 (there is also a second input 25 of the digital de-rotator for feeding it with a complex sine wave of frequency $-f_{IF}$. The output of the digital de-rotator (signal 27 at baseband) is coupled to digital front-end filter 21. Typical digital front-end filter 21 response is a low pass filter With a cut-off frequency 1.08 MHz/2 (approx. 500 kHz). The stopband attenuation of the digital front-end filter is design dependent (typically several tens of dB). Wanted NB signal 30 is passed undistorted to form signal 28 followed by an FFT module 22 to form signal 29 which is then fed into the rest of the receive chain as would be understood.

FFT module output bandwidth should be at least equal to the wanted NB bandwidth (72 subcarriers, so 72×15 kHz=1.08 MHz, as LTE subcarrier spacing is 15 kHz). For 72 subcarriers used in Cat-M1, it is clear that at least 128-point FFT should be used.

After FFT, the 72 central subcarriers are retained, and edge (guard) subcarriers are dropped. For example, with 128-point FFT, guard subcarriers at the left edge indexed [−64 . . . −37] and at the right edge indexed [37 . . . 63] should be dropped. Other FFT sizes may be used, depending on design but in any case, only the 72 central subcarriers of the wanted NB (for eMTC) should be retained at FFT output.

As shown in FIGS. 2 to 4 and 6 to 8, received signal 9 at antenna 13, when an eMTC transmission, comprises a wanted NB 30 comprising 72 sub-carriers 31 (at a 15 kHz spacing). NB centre frequency, $f_{NB}$ (32) defines the frequency location of the central carrier of the particular eMTC narrowband in RF spectrum. For example, if an eMTC device uses LTE Band 12, $f_{NB}$ will be within its downlink range of 728 . . . 746 MHz; if an eMTC device uses LTE Band 22, $f_{NB}$ will be in its downlink range 3.51 . . . 3.6 GHz, etc. Precise value of $f_{NB}$ within the given range is given by narrowband mapping defined by the eMTC standard).

Description now follows of how and why the sign and/or modulus of the intermediate frequency of signal 9 is selected which, in turn, determines the frequency of the local oscillator signal 23 ($f_{LO}=f_{NB}-f_{IF}$) required to provide the selected intermediate frequency.

Selecting the Sign of the Intermediate Frequency

Figures 2, 3:
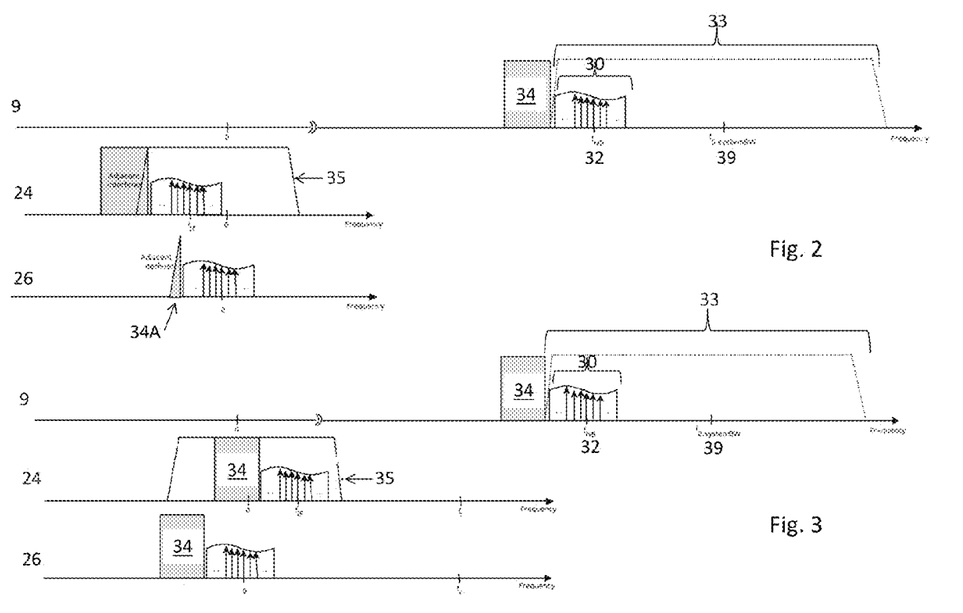
FIG. 2 illustrates adjacent interferer reduction in receive chain according to an embodiment.
FIG. 3 illustrates adjacent interferer example where more interferer power gets through to receiver chain.

Turning to FIGS. 2 and 3, an incoming signal 9 comprising NB 30 is shown in the context of system bandwidth 33. For example, system bandwidth 33 is 10 MHz wide (50 RBs) or 20 MHz wide (100 RBs) as mentioned in the background section.

For a given modulus of intermediate frequency $f_{IF}$, there are two possible choices for its sign (positive and negative). The sign of the intermediate frequency is determined as $sign(f_{IF})=sign(f_{NB}-f_{0.systemBW})$ where $f_{0.systemBW}$ is the central frequency (39) of system bandwidth 33.

As can be seen, selected intermediate frequency is negative for narrowbands that are less than (to the left of) the system bandwidth center frequency, and positive for narrowbands that are more than (to the right of) the system bandwidth center frequency otherwise. For example, FIG. 2 shows wanted NB 30 at the left edge of system bandwidth 33. To clarify, for any system bandwidth 33, an NB 30 at the left edge of system bandwidth is indexed 0 according to the eMTC standard. For example, with a system bandwidth of 10 MHz, narrowband 0 will have its leftmost subcarrier offset by −4.32 MHz with respect to $f_{0.systemBW}$. In all cases, narrowband index 0 implies vulnerability to an adjacent interferer 34 which is present right next to the system bandwidth left edge as shown. The passband of analog RF baseband filter 18 is shown (35) and is used to block the adjacent interferer as much as possible as per FIG. 2. Only a reduced amount of adjacent interferer 34A is passed through to subsequent parts of the rx chain at signal 26. However, as shown in FIG. 3, if in the same scenario (wanted NB 30 at the left edge of system bandwidth 33) a positive intermediate frequency is selected, then much more unfiltered adjacent interferer power gets into the rx chain at signal 26.

In summary, for an NB 30 centre frequency $f_{NB}$ 32 to the left of $f_{0.systemBW}$, $f_{NB}<f_{0.systemBW}$, therefore a negative $f_{IF}$ is selected.

For an NB 30 with the centre frequency $f_{NB}$ 32 to the right of $f_{0.systemBW}$, $f_{NB}$ $f_{0.systemBW}$, therefore a positive $f_{IF}$ is selected.

If the wanted NB is on the left hand side of the system bandwidth 33 it is desired to keep it on the left hand side of the analog filter 18 response to minimize adjacent interferers. If the wanted NB is on the right hand side of the system bandwidth 33 it is desired to keep it on the right hand side of the analog filter 18 response to minimize adjacent interferers.

As a practical example, let us take LTE Band 13 (50 resource blocks centered at $f_{0.systemBW}=751$ MHz). In this band, according to the eMTC standard, we have 8 narrowbands of 6 resource blocks each. Out of these 8 narrowbands, four will have $f_{NB}<751$ MHz (so 'to the left' of center frequency), and four will have $f_{NB}>751$ MHz (to the right). For example, it follows that narrowband index 0 will have $f_{NB}=746.77$ MHz, so for this narrowband we shall use negative $f_{IF}$. On the rightmost edge, narrowband index 7 will have $f_{NB}=754.78$ MHz, so for this narrowband we shall use positive $f_{IF}$.

The choice of sign of $f_{IF}$ is irrespective of the modulus of $f_{IF}$.

Selecting the Modulus of the Intermediate Frequency

Figure 4:
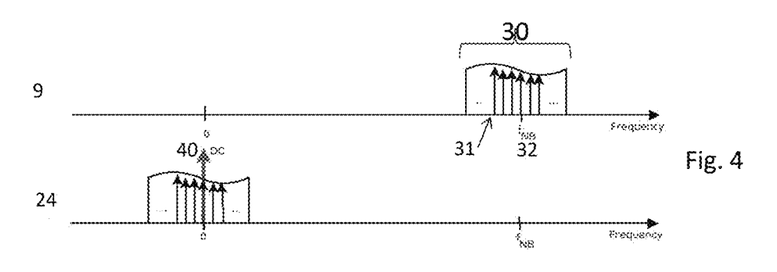
FIG. 4 illustrates carrier at $f_{NB}$ (central carrier) of a wanted NB being over shadowed by DC in a direct conversion architecture for eMTC.

Turning to FIG. 4, and as discussed earlier, in the case of zero-IF receiver architecture, local oscillator frequency $f_{LO}$ (23) equals the narrowband center frequency $f_{NB}$ (this frequency defines ultimate location of eMTC transmission narrowband in system BW and in RF spectrum). Value of $f_{LO}=f_{NB}$ thus varies according to LTE band number used by a particular eMTC operator (e.g., in the range 728 . . . 746 MHz for downlink of Band 12; in the range 3.51 . . . 3.6 GHz for downlink of Band 22, etc.)

Figures 5, 6:
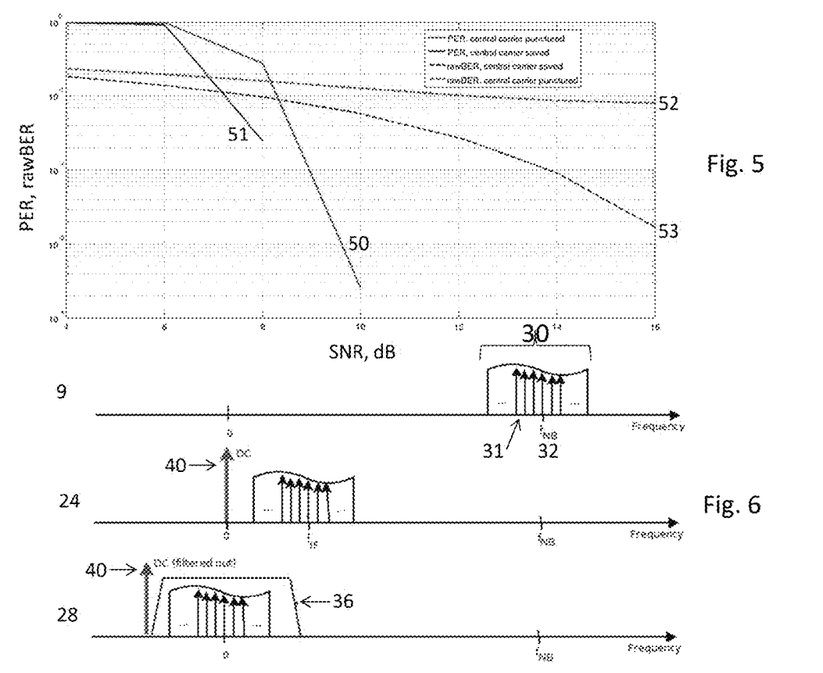
FIG. 5 illustrates an example of performance penalty incurred by puncturing the central (DC) carrier of a wanted NB.
FIG. 6 illustrates selecting the modulus of IF such that DC is filtered out by digital front-end.

When $f_{LO}=f_{NB}$, signal 24 at the output of mixer 16 is as shown in FIG. 4. The central sub-carrier is aligned with DC 40 and hence overshadowed and lost (punctured). This can result in a non-negligible performance penalty as shown in FIG. 5 (MCS14, 1 RB allocated, coding rate 0.45). It can be seen that the packet error rate (PER) of curve 50 (with DC puncturing) exhibits ~2 dB loss compared to that of the reference curve 51 (DC carrier saved). This is also confirmed by the raw (uncoded) BER curve in that in the punctured case (52), it exhibits an error floor which is absent in the reference case (53).

Figure 7:
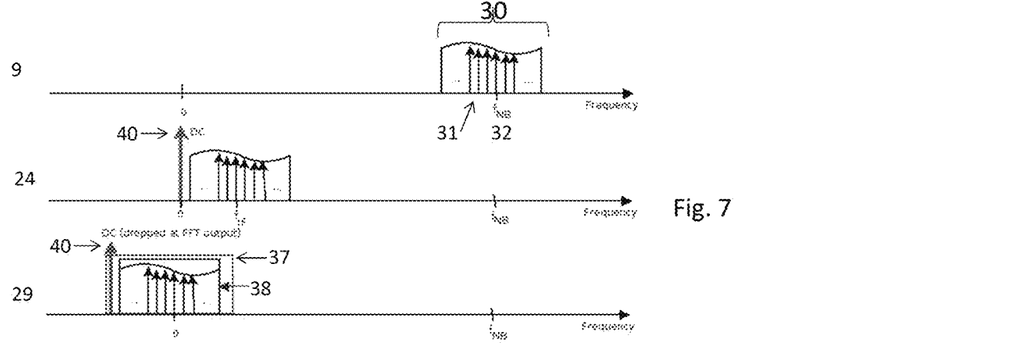
FIG. 7 illustrates selecting the modulus of IF such that DC is dropped at FFT output.

The modulus of $f_{IF}$ may be selected based on one of three desired scenarios:

1. FIG. 6—DC 40 falls outside the wanted NB 30, so it is filtered by subsequent digital front-end filter 21. As can be seen, $f_{IF}$ should fall into stopband 36 of the digital front-end filter: typically, this stopband spans the range between half NB bandwidth (500 kHz) and half of ADC sampling rate, the latter being design-dependent. To put it another way, |$f_{IF}$|>=stopband offset, where stopband offset is offset with respect to 0 Hz of the stopband of the digital front-end filter 21.
2. FIG. 7—DC 40 falls outside the wanted NB 30, so it is falls on a guard band carrier, and thrown away when picking the result of FFT 22 (37 denotes the FFT output bandwidth and 38 denotes the band retained after picking the result of FFT). As can be seen, $f_{IF}$ should fall in one of the guard carriers at the edges of the FFT: $|f_{IF}|=k \times FFT$ subcarrier spacing (15 kHz in eMTC). Carrier index k in guard band where DC carrier should be mapped is FFTsize/2>k>kbandedge where kbandedge is the outermost carrier index of wanted NB 30. For example, in case of 128-point FFT centered at DC, k is in one of ranges [−64 to −37] (left guard band) or [37 to 63] (right guard band).

Figure 8:
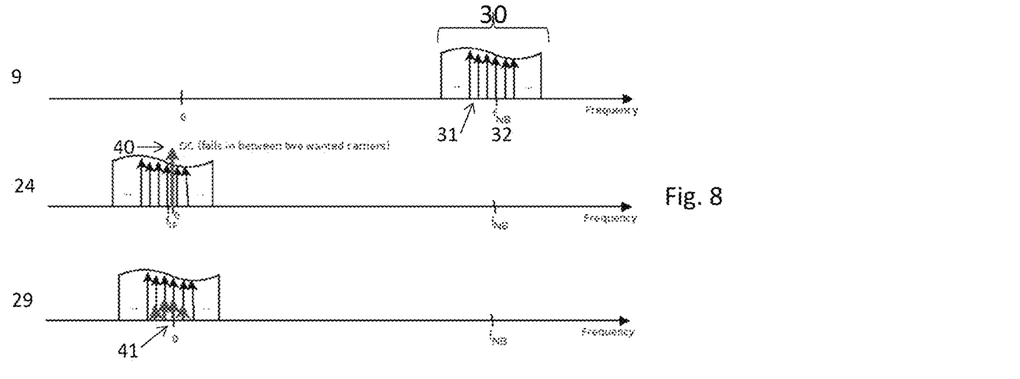
FIG. 8 illustrates selecting the modulus of IF such that DC falls in between FFT carriers and is spread post-FFT.

3. FIG. 8—DC 40 falls inside the wanted NB 30, but right in between two subcarriers, so its shadowing effect on neighbour carriers is significantly reduced (41 denoted by shorter arrows). Typical choice of intermediate frequency is
$|f_{IF}|=(k+\frac{1}{2}) \times FFT$ subcarrier spacing (15 kHz in eMTC), with k in range [−64 to 63] for 128-point FFT.

In all three scenarios of FIGS. 6, 7 and 8, the central carrier of the wanted NB is saved and hence throughput penalty due to puncturing of the carrier is avoided. This can also be applied to any post-mixer 16 RF spur or plurality of spurs. As would be understood, a spur is a sinusoidal tone interfering with the wanted signal. It may arise from undesired signal coupling during the process of wanted signal down-conversion from RF carrier to the baseband or intermediate frequency.

Typically, the sign of the intermediate frequency may be dynamically changed as it depends on the position of the wanted NB 30 with respect to the system bandwidth centre frequency. Wanted NB 30 depends on the narrow band index which, in eMTC, is allocated dynamically by the communications network (hopping as would be understood). Dynamic allocation of wanted NB occurs, typically, on a per LTE subframe basis as would be understood i.e. with the granularity of 1 ms. Typically, the modulus of the intermediate frequency is a constant parameter of a particular low-IF receiver and incoming RF signal combination.

Figure 9:
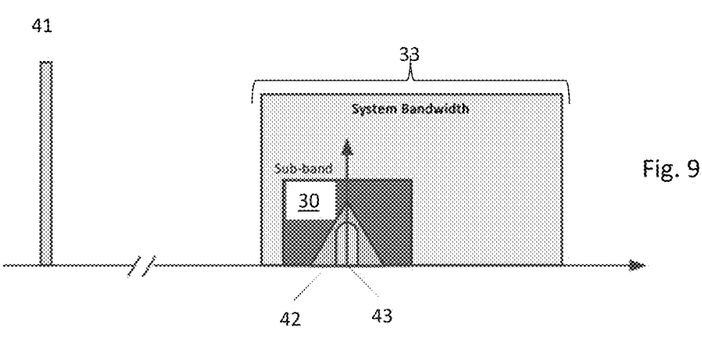
FIG. 9 illustrates noise in a zero-IF receiver architecture.
Figure 10:
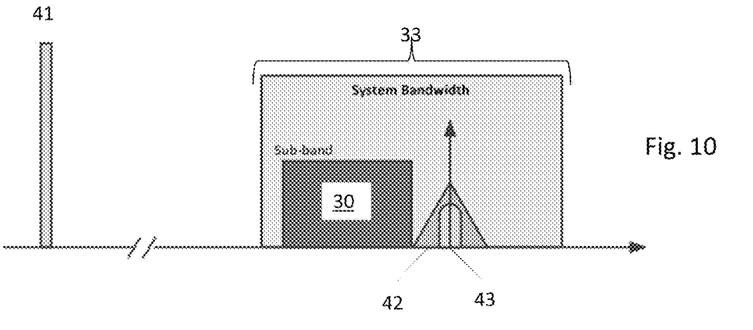
FIG. 10 illustrates noise in a low-IF receiver architecture according to an embodiment.

The described use of a low-IF receiver architecture also has other benefits. As illustrated in FIGS. 9 and 10, blocking signals 41 that are outside of system bandwidth 33 can create unwanted DC components, flicker noise 42 and second order distortion products 43 within the (NB) band of interest 30. A low-IF architecture can preserve SNR by removing this noise from the band of interest.

Flicker noise 42 is a form of noise found in all electronic devices that has a power spectral density proportional to 1/f which means most noise power is concentrated at low frequencies. When the wanted signal is mixed to low frequencies it will be polluted by this type of electronic noise.

Second-order distortion products 43 are created around the LO frequency used for down-conversion. This is because if an out-of-band signal 41 with bandwidth B enters the receiver, its inherent second order distortion will create frequency products near DC with a bandwidth 2B (43). Receiver second-order distortion can be improved by careful design but there is a practical limit and some residual distortion is unavoidable. Further this makes the receiver more expensive.

In a zero-IF receiver as illustrated in FIG. 9, these unwanted spectral components degrade the in-band signal-to-noise ratio (SNR). In contrast, the unwanted components created in a low-IF lineup as in FIG. 10 fall outside the band of interest and preserve SNR. Moving the desired signal away from DC means that at least narrow-bandwidth blockers won't degrade the wanted signal 30. Since most high power jamming signals are relatively narrow (e.g. GSM transmitters, radar signals, or digital TV signals), a carrier shift by a few Megahertz is sufficient to move these components outside the bandwidth of interest 30.

It is noted that for most applications when using low-IF receivers, image frequencies (frequencies at the negative offset from the wanted frequencies) should be rejected so they do not contribute to in-band noise. Image frequencies (part of RF spectrum aliasing onto the wanted band 30) are undesired interference created by phase or amplitude imperfections in the analog local oscillator 23 used in the mixer 16 for down conversion to signal 24. In zero-IF receivers, image band coincides with wanted band 30 and the image signal (interference) is a mirrored version of the wanted signal. In low-IF receivers, the image band is offset from the wanted band 30 by $-f_{IF}$. For any $f_{NB}$, using the selected $f_{IF}$, $f_{NB}-f_{IF}$ always falls within the system bandwidth 33. This is beneficial because within system bandwidth 33, signal spectrum is approximately flat (whole system bandwidth is transmitted by a base station with an approximately flat spectral density) and so an image will be approximately the same power as a wanted NB 30.

In eMTC systems with a system bandwidth greater than twice the wanted subband 30, the image frequencies will always be within the system bandwidth. Since the power spectral density within the system bandwidth is flat as discussed, the image rejection requirements are no higher than with a zero-IF receiver supporting eMTC.

Figure 11:
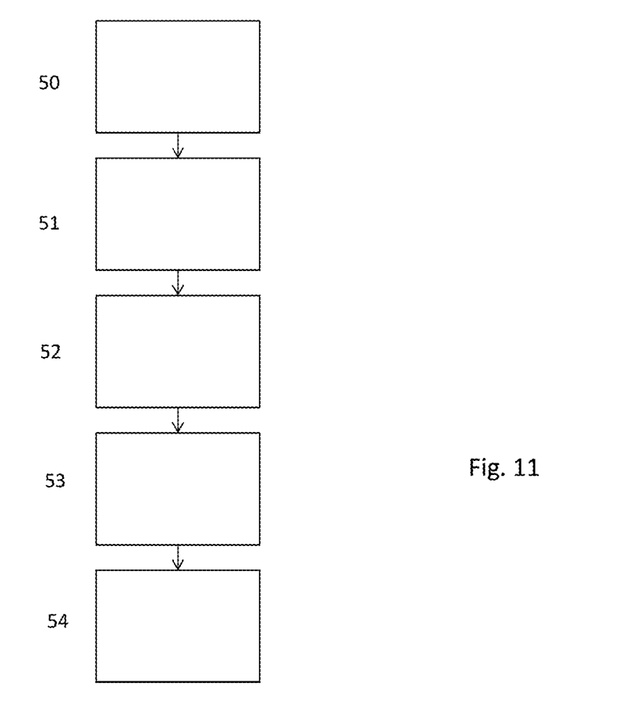
FIG. 11 illustrates a method according to an embodiment.

Based on the foregoing, and as illustrated in FIG. 11, there is provided a method of selecting an intermediate frequency, IF, for use with a low-IF receiver. In step 50, the central frequency 39 of the system bandwidth 33 of the communication scheme used by the low-IF receiver is determined (a first frequency). In step 51, the central frequency 32 of the bandwidth of the wanted signal to be received by the low-IF receiver is determined (a second frequency). In step 52, the sign of the IF to be used is selected based on the first and second frequencies.

In step 52 the sign of the IF to be used may be selected so that power of an interferer adjacent to the system bandwidth is minimised in the receive chain of the low-IF receiver. In step 52 the sign of the IF to be used may be selected so that an analog RF baseband filter of the low-IF receiver blocks at least a portion of the adjacent interferer. In step 52, the sign of the IF to be used is selected as negative if the second frequency is less than the first frequency in the system bandwidth and the sign of the IF to be used is selected as positive if the second frequency is more than the first frequency in the system bandwidth. Steps 50 and 51 can be carried out in any order.

In step 53, the modulus of the IF to be used is determined so as to minimise DC carrier 40 puncturing of the wanted signal to be received. The modulus may be determined based on the position of DC of the receiver relative to the wanted signal.

Step 53 may be achieved in one of three ways:

The modulus of the IF to be used is determined so that the position of DC falls outside of the wanted signal and it is filtered by a digital front-end filter 21 of the low-IF receiver thereby avoiding any DC carrier puncturing.

The modulus of the IF to be used is determined so that the position of DC falls outside of the wanted signal and onto a guard band of an FFT module 22 of the low-IF receiver and is thrown away when obtaining the result of the FFT thereby avoiding any DC carrier puncturing.

The modulus of the IF to be used is determined so that the position of the DC falls within the wanted signal but in between two carriers of the wanted signal thereby reducing interference caused 41 by DC offset 40.

In a step 54, a local oscillator of the low-IF receiver is set to provide a frequency output of the second frequency minus the intermediate frequency. This can be provided to an input of a mixer, the mixer having a further input of the incoming RF signal 9 and an output at the intermediate frequency to be used.

Steps 52 and 53 may be carried out together, or on their own.

The various methods described above may be implemented by a computer program. The computer program may include computer code arranged to instruct a computer (e.g. a processor) to perform the functions of one or more of the various methods described above. The computer program and/or the code for performing such methods may be provided to an apparatus, such as a computer (processor) on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

The particular use of low IF (in eMTC) disclosed herein has the following advantages:
Increased ADC dynamic range and decreased probability of saturation of Rx chain as adjacent interferer power is reduced with the proposed choice of IF frequency.
Saving the centre downlink (DL) subcarrier of a wanted NB, which is otherwise shadowed by DC and punctured which may result in non-negligible performance degradation. Data throughput is increased.
Mitigation of post-mixer RF spurs, so increased throughput as less carriers are shadowed.
Moving DC components and flicker noise, which are associated with zero-IF architectures, outside the sub-band of interest
Moving second order distortion products created by out-of-band blockers outside the sub-band of interest
The low-IF architecture avoids issues with DC components, flicker noise and second-order distortion products created by out-of-band jammers that are associated with direct conversion receivers.
This is achieved by at least one of:
LO frequency chosen always towards the centre of the system bandwidth, so that adjacent channel power leaking through the RF baseband filter is reduced.
choice of IF so that DC or post-mixer spurs fall either outside the wanted NB, or on a guard band carrier, or in-between two carriers. The result is being able to demodulate (w/o puncturing) all carriers of any eMTC NB.

All aspects of this disclosure of a low-IF receiver architecture with particular choice of IF frequency, allows for saving the DC carrier and improving robustness to adjacent channel interference and RF imperfections to reduce packet error rate (PER) on a given transmission, thus alleviating the need for packet re-transmission, or reducing the number of packets to re-transmit. Less re-transmissions translates to improved battery life of the device, better quality of service (eMTC user-wise) and improved network coverage and overall efficiency (eMTC operator-wise).

What is claimed is:

1. A method of selecting an intermediate frequency, IF, for use with a low-IF receiver, the method comprising:
    selecting a negative IF if a second frequency is less than a first frequency;
    wherein the first frequency is defined as the central frequency of the system bandwidth of an RF signal received by the low-IF receiver; and
    wherein the second frequency is defined as the central frequency of the bandwidth of a wanted RF signal within the system bandwidth of the RF signal received by the low-IF receiver.

2. The method of claim 1 wherein either a negative IF or a positive IF is selected so that power of an interferer adjacent to the system bandwidth is minimized in the receive chain of the low-IF receiver.

3. The method of claim 2 wherein either a negative IF or a positive IF is selected so that an analog RF baseband filter of the low-IF receiver blocks at least a portion of the adjacent interferer.

4. The method of claim 1 wherein a positive IF is selected as positive if the second frequency is more than the first frequency in the system bandwidth.

5. The method of claim 1 wherein a negative IF is selected if (second frequency–first frequency) is negative and a positive IF is selected if (second frequency–first frequency) is positive.

6. The method of claim 1 wherein a modulus of the IF to be used is selected so as to minimize DC carrier puncturing of the wanted RF signal to be received.

7. The method of claim 1 wherein a modulus of the IF to be used is selected based on the position of a DC offset of the low-IF receiver relative to the wanted RF signal.

8. The method of claim 1 wherein a modulus of the IF to be used is selected so that the position of a DC offset of the low-IF receiver falls outside of the wanted RF signal and it is filtered by a digital front-end filter of the low-IF receiver thereby avoiding any DC carrier puncturing.

9. The method of claim 1 wherein a modulus of the IF to be used is selected so that the position of a DC offset of the low-IF receiver falls outside of the wanted RF signal and onto a guard band of an FFT module of the low-IF receiver, wherein the guard band of the FFT module and is thrown away when obtaining the result of the FFT thereby avoiding any DC carrier puncturing.

10. The method of claim 1 wherein the wanted RF signal comprises a plurality of subcarriers and wherein a modulus of the IF to be used is selected so that the position of a DC offset of the low-IF receiver falls within the wanted RF signal but in between two of the plurality of subcarriers of the wanted RF signal thereby reducing DC carrier puncturing.

11. The method of claim 1 wherein to down convert an incoming RF signal to the intermediate frequency to be used, a local oscillator of the low-IF receiver is set to provide a frequency output of the second frequency minus the intermediate frequency to be used to an input of a mixer, the mixer having a further input of the incoming RF signal and an output at the intermediate frequency to be used.

12. A non-transitory computer readable medium comprising instructions that when executed by a processor cause the processor to carry out the method of claim 1.

13. A low-IF receiver configured to carry out the method of claim 1.

14. The low-IF receiver of claim 13 further comprising a mixer, an analog filter, a digital filter and an FFT module.

* * * * *